US009454857B2

(12) United States Patent
Pfister

(10) Patent No.: US 9,454,857 B2
(45) Date of Patent: Sep. 27, 2016

(54) METHOD FOR TESTING A VEHICLE OR A COMPONENT OF A VEHICLE

(71) Applicant: AVL LIST GMBH, Graz (AT)

(72) Inventor: Felix Pfister, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 14/402,235

(22) PCT Filed: May 24, 2013

(86) PCT No.: PCT/EP2013/060728
§ 371 (c)(1),
(2) Date: Nov. 19, 2014

(87) PCT Pub. No.: WO2013/174974
PCT Pub. Date: Nov. 28, 2013

(65) Prior Publication Data
US 2015/0149031 A1 May 28, 2015

(30) Foreign Application Priority Data
May 25, 2012 (AT) .............................. A 50203/2012

(51) Int. Cl.
*G07C 5/08* (2006.01)
*G01M 17/007* (2006.01)
(52) U.S. Cl.
CPC ............. *G07C 5/085* (2013.01); *G01M 17/007* (2013.01)
(58) Field of Classification Search
CPC ............................. G07C 5/085; G01M 17/007

USPC ........................................................ 701/33.4
See application file for complete search history.

(56) References Cited

U.S. PATENT DOCUMENTS

| 8,549,903 B2 | 10/2013 | Rzehorska et al. |
| 8,631,692 B2 | 1/2014 | Pfister |
| 2002/0107627 A1* | 8/2002 | Funke et al. ............... 701/70 |
| 2007/0275355 A1 | 11/2007 | Langer et al. |

OTHER PUBLICATIONS

Gietelink et al. "Development of advanced driver assistance systems with vehicle hardware-in-the-loop simulations" Vehicle System Dynamics vol. 44, No. 7, Jul. 2006, 569-590, ISSN 0042-3114 print/ISSN 1744-5159 online.*
Bock et al., "Validation of the Vehicle in the Loop (VIL)—A milestone for the simulation of driver assistance systems", 2007 IEEE Intelligent Vehicles Symposium, Jun. 13-15, 2007, 1-4244-1068-1.*

(Continued)

*Primary Examiner* — Brian P Sweeney
(74) *Attorney, Agent, or Firm* — Dykema Gossett PLLC

(57) ABSTRACT

For a method for testing a vehicle or components thereof which is as flexible as possible, it is proposed that a test control unit 3 generates or plays back a virtual world which contains both a virtual vehicle state and a virtual vehicle environment, and the test control unit 3 manipulates a number of sensors and/or actuators of the real vehicle 1 according to the requirements of the virtual world and, at the same time, activates a driving state actuator 2 according to the requirements of the virtual world, and the driving state actuator 2 generates the instantaneous vehicle state and the instantaneous vehicle environment in the virtual world by introducing additional forces or moments into the real vehicle 1 so that the real vehicle 1 experiences the vehicle state and the vehicle environment from the virtual world on the real test track 4.

7 Claims, 2 Drawing Sheets

(56) References Cited

OTHER PUBLICATIONS

O. Gietelink et al., "Development of Advanced Driven Assistance Systems with Vehicle Hardware-in-the-Loop Simulations," Vehicle System Dynamics, Bd. 44, Nr. 7, Jul. 1, 2006, pp. 569-590.

Y. Laschinsky et al., "Evaluation of an Active Safety Light Using Virtual Test Drive Within Vehicle in the Loop," Industrial Technology, IEEE International Conference, Piscataway, N.J., U.S.A., Mar. 14, 2010, pp. 1119-1122.

T. Bock et al., "Vehicle in the Loop—Ein innovativer Ansatz zur Kopplung virtueller mit realer Erprobung," ATZ Automobiltechnische Zeitschrift, Ausgabe Jan. 2008, vol. 110, pp. 10-16.

English Abstract of Bock et al. Article.

* cited by examiner

METHOD FOR TESTING A VEHICLE OR A COMPONENT OF A VEHICLE

BACKGROUND OF THE INVENTION

The present application relates to a method for testing a vehicle or a component of a vehicle, wherein the real vehicle travels on a real test track.

In the development and testing of vehicles it is necessary to bring about certain driving states in order to test a certain behavior of the vehicle or of its sub-components under certain conditions. This can take place either on special test rigs, such as roller dynamometers for example, or on test tracks (whether these are in the form of real roads or on a special testing ground is not important here). Both possibilities have advantages and disadvantages. On test rigs, it is not possible to get as close to real environmental conditions as one might wish, as the desired real environment cannot be simulated with the necessary accuracy. A test on a test rig can therefore only ever be an indication of the real behavior of the vehicle on the real carriageway (albeit one which very closely approximates to the real conditions). On the other hand, very flexible test runs can be carried out on a test rig (such as a roller dynamometer for a vehicle for example). In turn, a test track is naturally limited in its options for driving through different environments, routes etc. It is therefore not possible to produce just any driving states on a test track. In addition, a test on a test track is usually dependent on the environmental conditions (temperature, humidity) and on the test driver (shift points, pedal position(s), steering angle, etc.) and therefore is also not wholly reproducible. However, by choosing different test tracks (e.g. an urban route or the Großglockner high alpine road) it is of course possible to cover a variety of routes and therefore test runs, which, however, is understandably laborious and only possible to a limited extent. Basically, however, neither option is ideal.

The object of the present invention is therefore to specify a test method and a test environment which combines the advantages of the two above-mentioned possibilities for testing a vehicle or components thereof and at least minimizes the associated disadvantages.

SUMMARY OF THE INVENTION

According to the invention, this object is achieved in that a test control unit generates or plays back a virtual world which contains both a virtual vehicle state and a virtual vehicle environment, and the test control unit manipulates a number of sensors and/or actuators of the real vehicle according to the requirements of the virtual world and, at the same time, activates a driving state actuator according to the requirements of the virtual world, and the driving state actuator generates the instantaneous vehicle state and the instantaneous vehicle environment in the virtual world by introducing additional forces or moments into the real vehicle so that the real vehicle experiences the vehicle state and the vehicle environment from the virtual world on the real test track.

As a result of the characteristics of the invention, a test-hardware-in-the-loop test rig is produced in practice, in which a real vehicle is moved on a real track but in doing so experiences a virtual world in which both the driving state and the vehicle environment can be specified almost at will. By using a driving state actuator and by manipulating the sensors and/or actuators of the vehicle, the vehicle therefore experiences the virtual world although it is really travelling on a real track. In this way, a test run is decoupled from the real track and, however, at the same time, the interaction between vehicle and real track is maintained.

Further advantageous embodiments of the invention can be seen from the dependent claims and the following description of the invention.

BRIEF DESCRIPTION OF THE DRAWINGS

The present invention is explained in more detail below with reference to the attached drawings, which show advantageous embodiments of the invention in a schematic and non-restricting form. In the drawings.

DETAILED DESCRIPTION OF THE DRAWINGS

Figure 1:
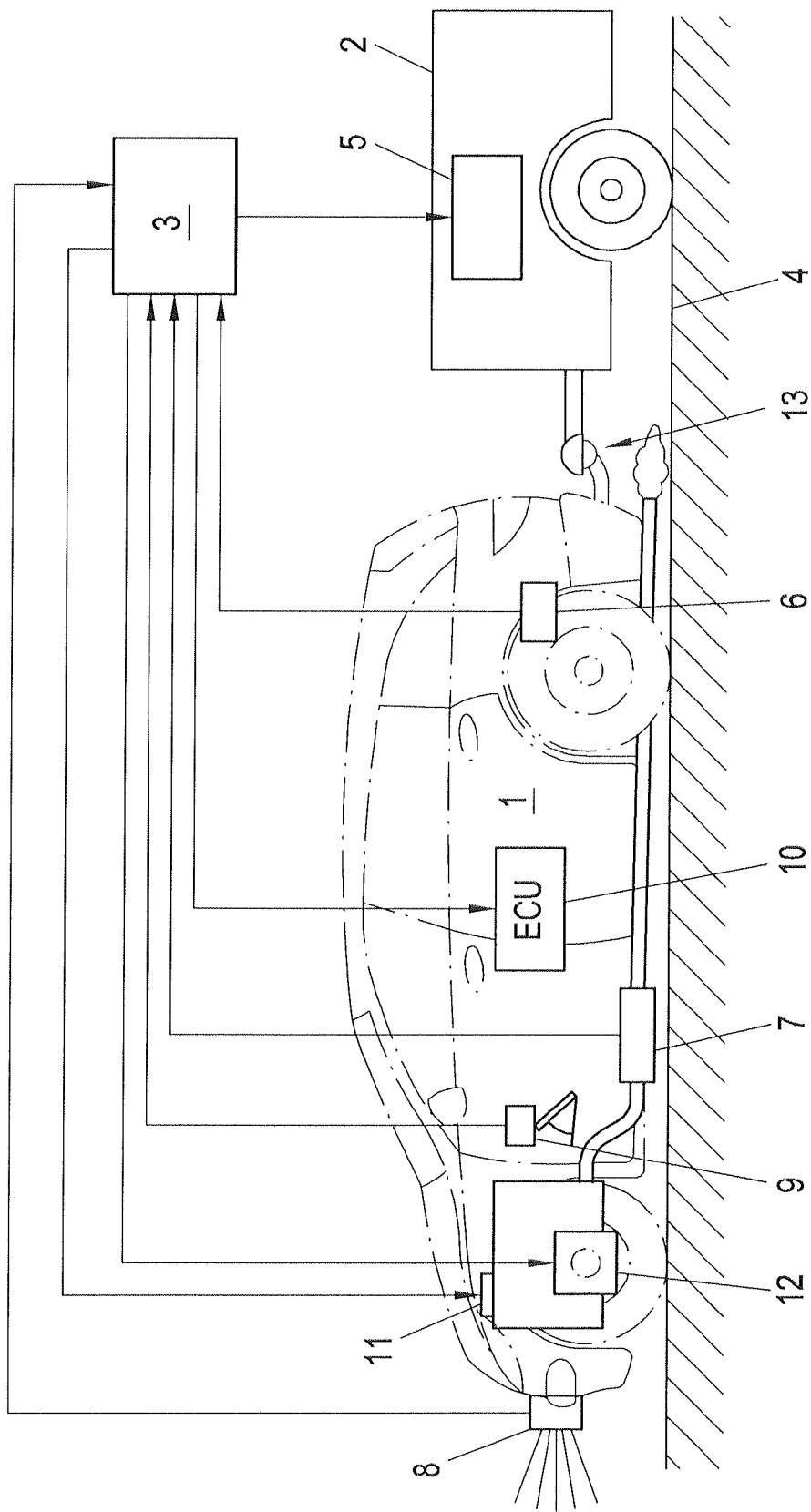
FIG. 1 shows a schematic diagram of a vehicle on a test track.

FIG. 1 shows a vehicle 1 on a test track 4. A secondary vehicle, in this case a trailer, is coupled to the vehicle 1 as a driving state actuator 2. The driving state actuator 2 can be coupled to the vehicle 1 using conventional ball-head trailer couplings, for example, as is usual with automobiles, or also using bolt-type trailer couplings with coupling jaw, coupling eye and bolt or semi-trailer coupling and kingpin as is usual with trucks. However, a rigid coupling can also be provided. Couplings with suitable kinematics, such as for example by means of a four-bar linkage which is known per se, are also conceivable. However, the specific type of coupling is not important for the invention.

The driving state actuator 2 has an independent drive and load machine which is not shown here and by means of which the driving state actuator 2 can be braked or driven, including on an individual wheel basis. In doing so, the type of drive and load machine, e.g., an internal combustion engine, an electrical machine such as an electrical synchronous machine for example, etc., is not important, as all that matters is that the driving state actuator 2 is able to produce a force in the longitudinal direction and/or transverse direction of the vehicle 1, that is to say, an acceleration or braking force. At the same time, it is also unimportant whether the driving state actuator 2 has one axle, a twin axle or two or more axles. It is likewise conceivable for only one axle or a plurality of axles of the driving state actuator 2 or each wheel of the driving state actuator to be individually driven. Further units for supplying the drive energy, e.g., a battery or a fuel cell, and/or units 5 for actuating the drive and load machine, e.g., suitable control and power electronics, can of course also be provided on the driving state actuator 2. However, it is of course also conceivable for different devices to be provided on the driving state actuator 2 as a drive and load machine for braking and driving, e.g., an electric motor for driving and an eddy current brake for braking. However, the driving state actuator 2 could also be coupled in front of the vehicle 1 and would then act as a tractor.

Advantageously, at least one wheel with independent drive and load machine, e.g. in the form of wheel hub motors, can be provided on each side of the driving state actuator 2. By this means, with such an individual wheel drive, as well as longitudinal forces (due to braking, pushing (or pulling)), transverse forces or moments about the vertical axis (yaw moments), e.g. to carry out torque vectoring which is known per se, can also be impressed on the vehicle 1. In this way, a further degree of freedom for the tests to be carried out is obtained and, for example, driving states with transverse forces or with yaw moments can now also be simulated in order for example to test the widely differing driving stability systems (such as for example ABS, ESP, etc.). However, this also enables certain driving states to be simulated, such as for example accelerating the vehicle against the curb when parking (e.g. for testing automatic parking aids).

To make testing the vehicle 1 more independent of the real test track, a test control unit 3 is now provided. This can be arranged on the driving state actuator 2 or also on the vehicle 1. A virtual world is generated and/or a previously generated virtual world is played back in the test control unit 3. This virtual world contains the desired vehicle state, that is to say, for example, speed, acceleration, torque, gear, media state (oil, water, fuel, etc.), etc., and also the vehicle environment, which is to say, for example, route topology, route geometry, weather conditions, road condition, traffic situation, etc. The test run to be carried out in order to test the vehicle 1 or a certain vehicle component is therefore included in the driving state. The virtual world therefore defines how the vehicle 1 is to move over a particular route.

In reality, however, the vehicle 1 is moved along a real test track 4, e.g., by a test driver or a driving robot, whereby the real vehicle state and the real vehicle environment are defined. However, as a rule, reality deviates considerably from the desired virtual world. In order to have the vehicle 1 believe that it is moving in the virtual world and therefore along a defined route under defined frame conditions, the measured values of real sensors, such as for example wheel speed sensors 6, longitudinal and transverse acceleration sensor, steering angle sensor, exhaust gas system sensors such as a λ-sensor 7 for example, vehicle environment sensors 8 for identification of the environment (such as radar, LIDAR, ultrasound for example), pedal position 9, etc., are recorded and fed to the test control unit 3. Here, the sensor measurements are manipulated according to the virtual world, i.e., modified in the way the measurements would have to be if the vehicle 1 were in the vehicle state and driving environment of the virtual world. These manipulated measurements are then made available to the units which process the measurements, such as for example an engine control unit 10 (ECU) or a transmission control unit, a vehicle stability system such as ABS, ESP for example, an injection system 11, etc. Likewise, actuators, such as for example a braking system 12, an injection system 11, a transmission unit, etc., can also be actuated by the test control unit 3 in accordance with the requirements of the virtual world. For this purpose, direct cabling between sensors and the measured value receivers can be interrupted or otherwise bridged and the sensors can be connected to the test control unit 3. In the case of a vehicle bus, as is common in modern vehicles, the test control unit 3 could also simulate a vehicle bus or part thereof.

Further, the driving state actuator 2 is also actuated by the test control unit 3 to not only simulate the virtual world but also to impress it upon the vehicle 1. The driving state actuator 2 generates forces (longitudinal and/or transverse forces) and/or moments which are introduced into the vehicle 1 via the coupling 13. The vehicle 1 therefore also "experiences" the virtual world. For example, this enables a headwind, downhill or uphill driving, bends, a certain load situation, certain road traffic (such as stop-and-go for example) to be simulated even though the vehicle 1 is in reality driving on a level, straight test track 4 or on a circuit.

At the same time, this simulation of the virtual world can go so far as to also enable the virtual world to be displayed to the driver via a monitor so that the driver can also see the virtual world.

This enables widely differing situations to be simulated—for example: For emissions tests, vehicles are equipped with a wealth of measuring equipment. However, the weight of the measuring equipment naturally distorts the fuel consumption and emissions values. For example, the weight of the measuring equipment could now be simulated out by the driving state actuator in order to obtain more accurate consumption and emissions measurements. Certain driving situations, such as driving in convoy or stop-and-go traffic, urban traffic, etc., are difficult to re-enact. However, such driving situations can be produced and tested with the method according to the invention.

The vehicle environment can also be obtained from available digital map material. Such digital maps, if necessary with various additional information such as traffic signs, topology, geometry, etc., can be procured commercially and also from online sources such as Google Earth for example. The vehicle environment of a particular route can then be extracted from this digital map material.

At the same time, it is also possible to provide virtual GPS data to a navigation system installed in the vehicle, e.g. by emulating sixteen satellite positions all around the vehicle by means of suitable transmitters. This enables any virtual location to be presented to the vehicle 1. For example, according to the invention, it is possible to simulate any urban route with traffic on any test track.

Today's vehicles increasingly also have systems which enable the route ahead to be analyzed, e.g. in the form of a digital map preview which can likewise be based on digital map material (as an image of reality). Information relating to the route ahead, such as traffic signs, roadworks, crossroads, etc., as well as topographical and geometric information relating to the route, such as for example bends, inclines, declines, etc., can be included in this digital map preview. Systems of the vehicle 1, such as for example the engine control unit (ECU), the transmission control unit (TCU) or also driver assistance systems such as for example Adaptive Cruise Control (ACC), separation control systems, brake assist systems, lane assist systems, etc., are able to optimize their respective functions in advance by means of this digital map preview. A control device, e.g. a navigation system, can determine the vehicle position, e.g. with the help of GPS, and can create the digital map preview and make it available to other units. For this purpose, the map data can be made available via the vehicle bus in a standardized data protocol such as ADASIS for example.

Figure 2:
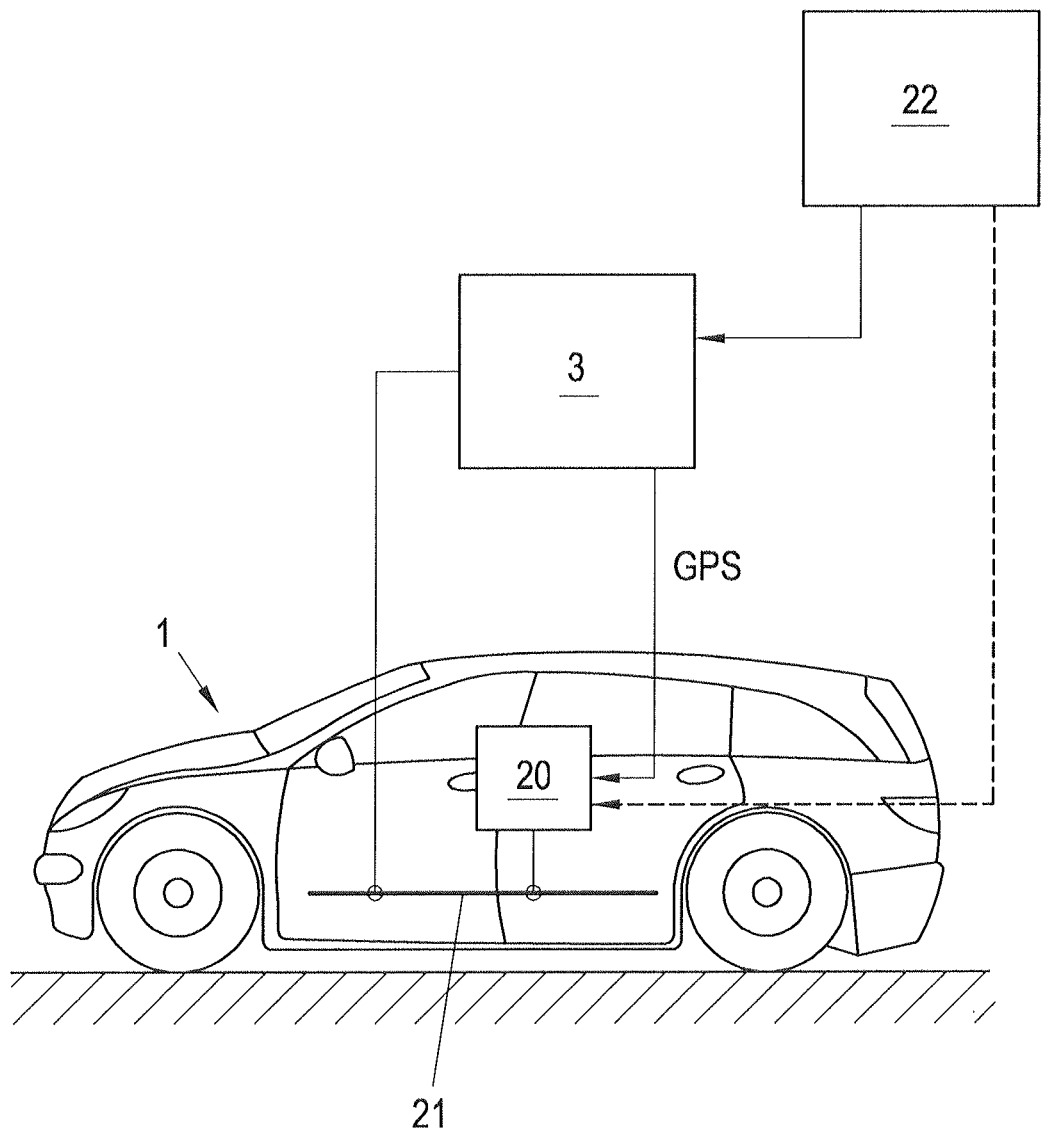
FIG. 2 shows the incorporation of digital maps in the method according to the invention.

Such digital map previews can also be incorporated into the method according to the invention, as shown schematically in FIG. 2. For this purpose, from the digital map material 22, the test control unit 3 creates the vehicle environment for the desired test track together with the required additional information. Alternatively, the vehicle environment can be made available to the test control unit 3. The test control unit 3 now feeds the GPS route data to a control device 20 of the vehicle 1, e.g. a navigation system, a transmission control unit, an engine control unit, etc., during the test run. Alternatively, the GPS data can also be emulated as described above. By this means, the vehicle 1 is deceived into believing that it is actually moving along the desired route, whereby the functions of the digital map preview also work and can be tested. The digital map preview can also be made available to other units of the vehicle 1, such as for example ECU, TCU, ACC, etc., via the vehicle bus 21. Also, in order to avoid deviations in the test run, the digital map material which is available to the vehicle 1 should correspond with the digital map material 22 from which the vehicle environment has been obtained, as indicated in FIG. 2 by the dashed line.

The invention claimed is:

1. A method for testing a real vehicle or a component of a real vehicle, wherein the real vehicle drives on a real test track and is associated with a driving state actuator, wherein a test control unit which is arranged on the real vehicle or on the driving state actuator generates or plays back a virtual world which contains both a virtual vehicle state and a virtual vehicle environment, and measured values of real sensors of the real vehicle are recorded and fed to the test control unit and the test control unit manipulates the measurements of a number of real sensors and/or actuators of the real vehicle according to requirements of the virtual world and, at the same time, activates the driving state actuator according to the requirements of the virtual world, and the driving state actuator generates the instantaneous vehicle state and the instantaneous vehicle environment in the virtual world by introducing additional forces or moments into the real vehicle so that the real vehicle experiences the vehicle state and the vehicle environment from the virtual world on the real test track.

2. The method as claimed in claim 1, wherein the vehicle state generated by the test control unit also includes a media state of the vehicle.

3. The method as claimed in claim 1, wherein the real vehicle includes a control device and the test control unit sends data to the control device, which enables the control device to determine the position of the vehicle.

4. The method as claimed in claim 3, wherein the control device creates a digital map preview based on the determined position and based on digital map material and makes it available to other units of the vehicle.

5. The method as claimed in claim 1, wherein GPS data are emulated, which enables a control device of the vehicle to determine the position of the vehicle.

6. The method as claimed in claim 1, wherein longitudinal and/or transverse forces and/or moments are introduced into the vehicle by means of the driving state actuator.

7. The method as claimed in claim 1, wherein the driving state actuator comprises a trailer attached to the real vehicle.

* * * * *